M. J. WALSH.

Cotton-Jacks.

No. 6,559. Reissued July 27, 1875.

Witnesses:
Michael Ryan
Fr C T Haynes

M. J. Walsh
by his Attorneys
Brown & Allen

N. PETERS, PHOTO-LITHOGRAPHER, WASHINGTON, D. C.

UNITED STATES PATENT OFFICE.

MAURICE J. WALSH, OF NEW YORK, N. Y.

IMPROVEMENT IN COTTON-JACKS.

Specification forming part of Letters Patent No. 157,044, dated November 17, 1874; reissue No. 6,559, dated July 27, 1875; application filed July 1, 1875.

*To all whom it may concern:*

Be it known that I, MAURICE J. WALSH, of New York city, in the county and State of New York, have invented certain new and useful Improvements in Cotton-Jacks; and I do hereby declare that the following is a full, clear, and exact description of the same, reference being had to the accompanying drawing, making part of this specification.

My invention relates to a jack for pressing cotton into a compact form in the holds of vessels, in warehouses, or elsewhere, in which the head of the jack itself is employed as the medium to bear upon the cotton to be pressed.

The invention consists, first, in providing a jack with a driving-engine mounted directly on the jack, so that the body of the jack serves as the bed-plate or foundation of the engine. The invention consists, further, in the employment of a shaft made to reciprocate in the body of the jack by means of gearing connected with the shaft of the engine, with the outer end of the shaft bearing against a fixed obstacle, and the end or head of the jack bearing against the cotton to be pressed, and in certain details of construction hereinafter more fully set forth.

Figure 1:
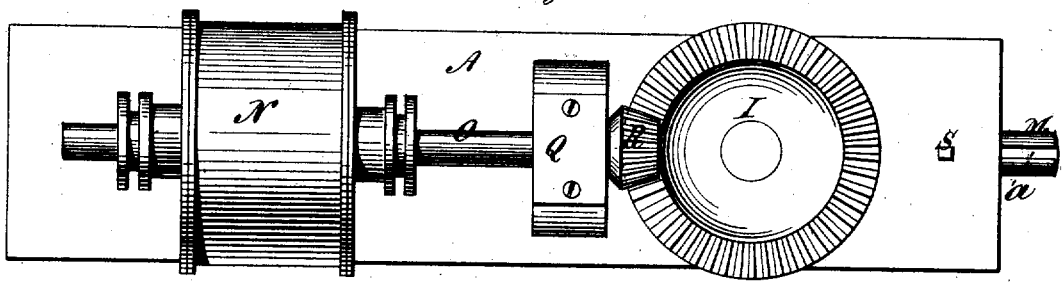
Figure 2:
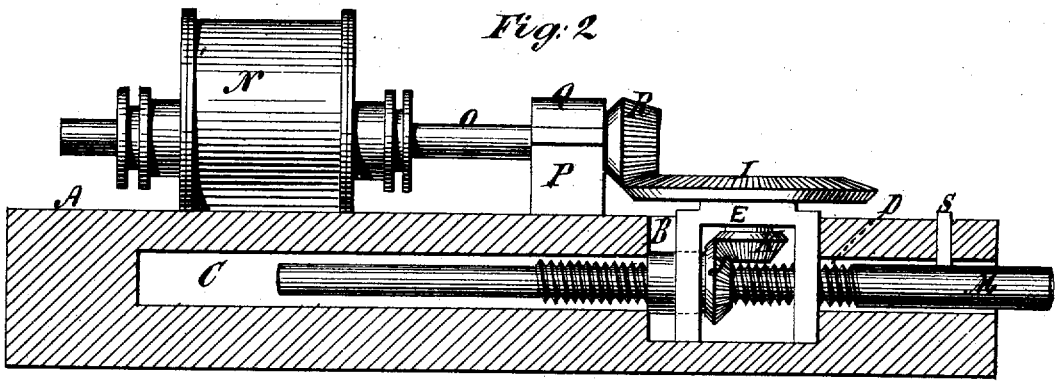
Figure 3:
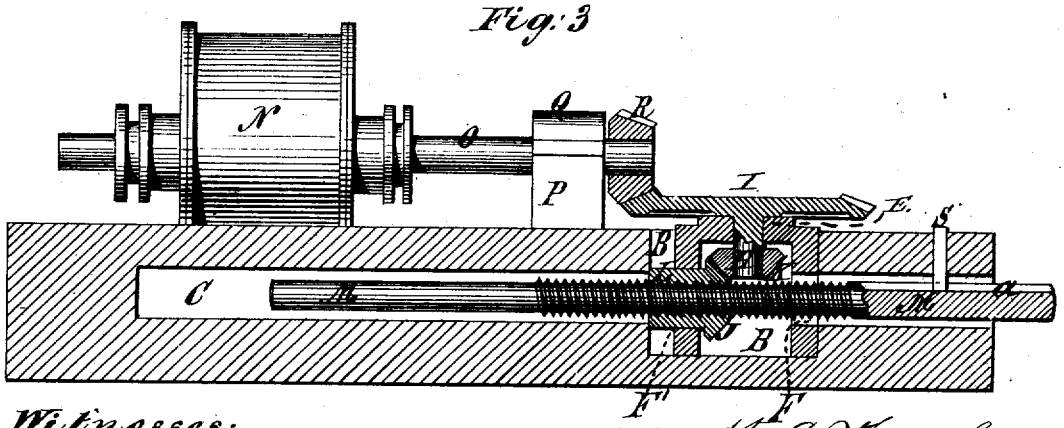

In the accompanying drawing, Figure 1 is a top view of a jack constructed according to my invention. Figs. 2 and 3 are longitudinal sections of the same.

A represents the body of the jack, having in its face a recess, B, from two opposite sides of which two passages, C, D, extend longitudinally of the jack, the passage D extending entirely through one end of the body A and the passage C toward the opposite end, but not entirely through the same. E is a bridge, fitting snugly in the recess B, and having openings F F′ in line with the passages C D. On the upper face of the bridge E is a boss or hub, in which is an opening, which forms the bearing for the axis H of a bevel gear-wheel, I, the lower side of which is constructed to bear upon said boss or hub. K is a bevel-pinion, attached to the shaft or axis H of the wheel I, revolving with it and meshing into a bevel-pinion, J, on one end of a sleeve or collar, L, which has its bearings in the opening F′ of the bridge E, and is provided with an internal or female screw-thread. M is a shaft which works in the passages C D of the body A, and in the openings F F′ of the bridge E, and has its middle portion provided with an external or male thread engaging with the internal thread of the sleeve or collar L. A driving-engine, N, is attached to the body A of the jack, so that said body serves as the bed-plate or foundation of the engine. A shaft, O, has its bearings in the heads of the engine and in a block, P, provided with a cap, Q. On one end of the shaft O is a bevel-wheel, R, which engages with the wheel I. In the shaft M is a longitudinal groove, *a*, extending from its screw-threaded portion to its outer end. A pin, S, passes through the body A, and engages with the groove *a* in the shaft M, and thus serves to guide said shaft in its longitudinal reciprocating motion, and at the same time to prevent rotary motion of the same.

The operation is as follows: The outer end of the shaft M is made to bear against the samson-post of a vessel, or a brace connected therewith, when the jack is employed in the hold of a vessel, or some fixed obstacle, and power is applied by the engine to the shaft O, whereupon a rotary motion is imparted to the bevel-wheel I, and, through the wheels K J, to the sleeve L, which in turn imparts a longitudinal reciprocating motion to the shaft M, and causes the head or end of the body A to exert the desired pressure against the bale to be pressed. A reverse motion of the engine relieves the pressure.

What I claim as new, and desire to secure by Letters Patent, is—

1. A screw-jack for pressing cotton, &c., combined with an engine for reciprorating the screw to move the body of the jack, the said engine being mounted upon and secured to the said jack-body, substantially as and for the purpose described.

2. In a jack for pressing cotton, and for similar purposes, a shaft, one end of which bears upon a fixed obstacle and imparts a longitudinal motion to a pressing-block, in which it reciprocates by means of intermediate gearing operated by means of the shaft of an engine, substantially as described and for the purpose set forth.

3. The pressing-block A, having the recess B and passages C D, in combination with the screw-shaft M, having a longitudinal but no rotary movement, the sleeve L, provided with a pinion on its end, gear-wheel I, pinion R, and driving-shaft O, substantially as described, and for the purpose set forth.

4. The screw-shaft M, provided with the longitudinal groove *a*, and operated as set forth, in combination with the pressing-block A, provided with the pin S, substantially as described, and for the purpose set forth.

MAURICE J. WALSH.

Witnesses:

MICHAEL RYAN,
JNO. D. PATTEN.